March 28, 1950  G. H. LELAND  2,501,950
COMMUTATING SWITCH MECHANISM
Filed July 10, 1947  4 Sheets-Sheet 2
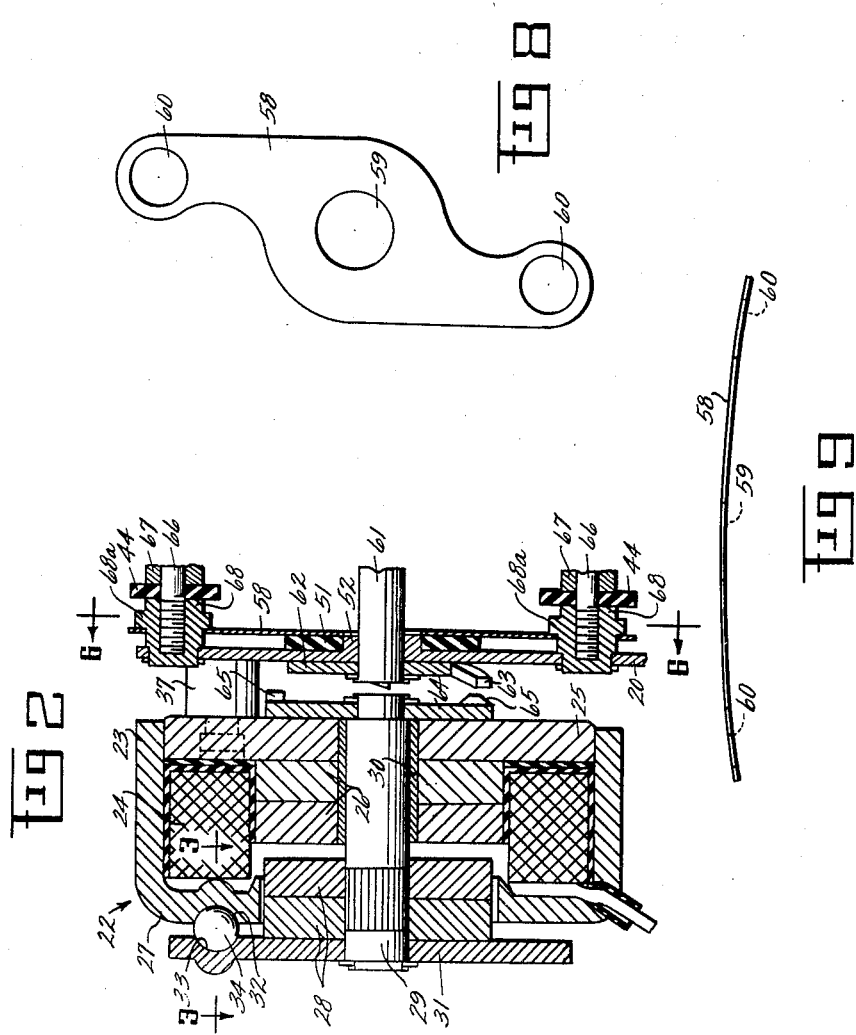
INVENTOR.
GEORGE H. LELAND
BY
Edward Reed.
ATTORNEY- March 28, 1950 G. H. LELAND 2,501,950
COMMUTATING SWITCH MECHANISM
Filed July 10, 1947 4 Sheets-Sheet 3
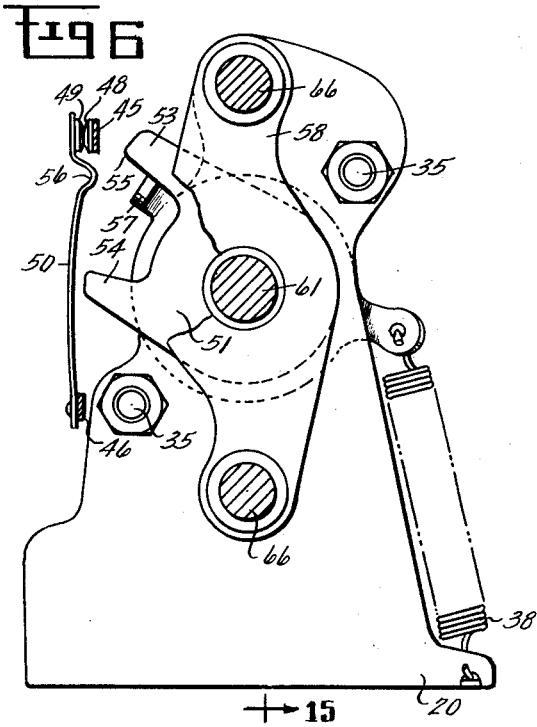
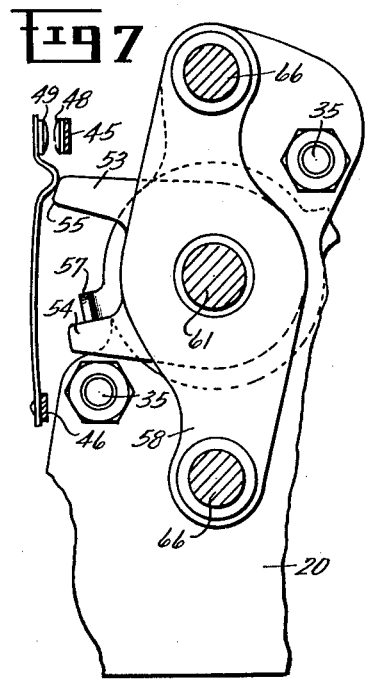
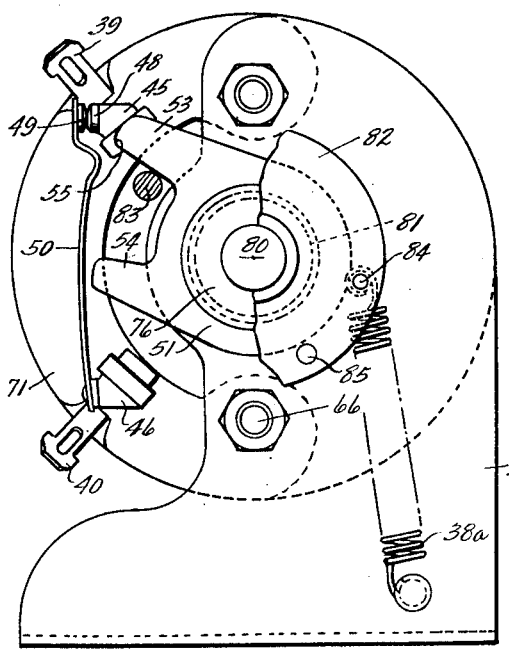
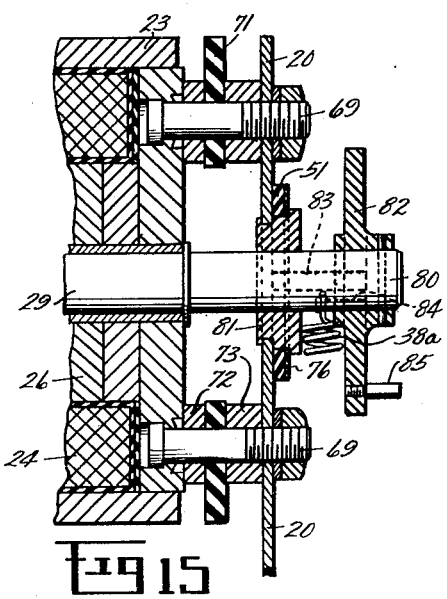
INVENTOR.
GEORGE H. LELAND
BY
ATTORNEY—

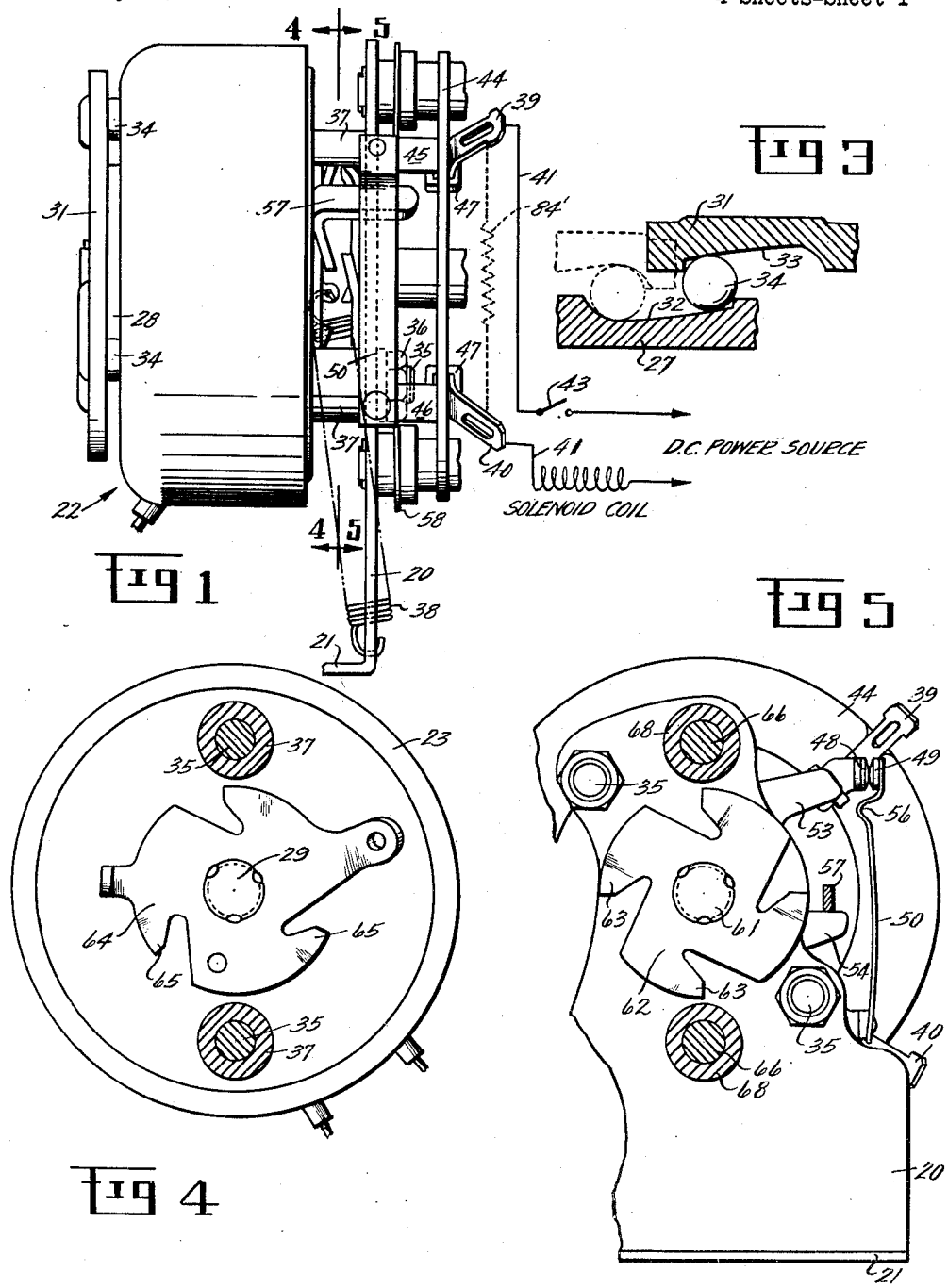

March 28, 1950 G. H. LELAND 2,501,950
COMMUTATING SWITCH MECHANISM
Filed July 10, 1947 4 Sheets-Sheet 4
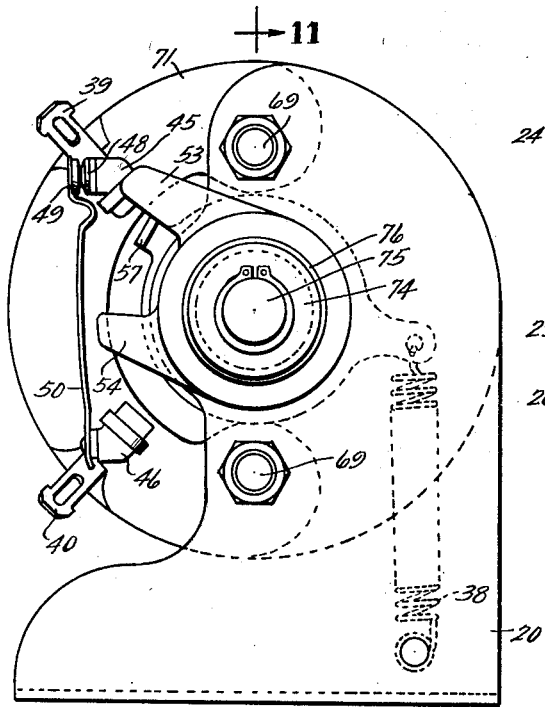
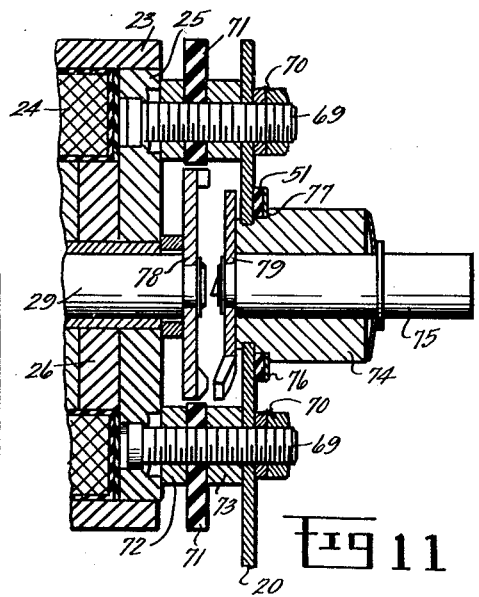
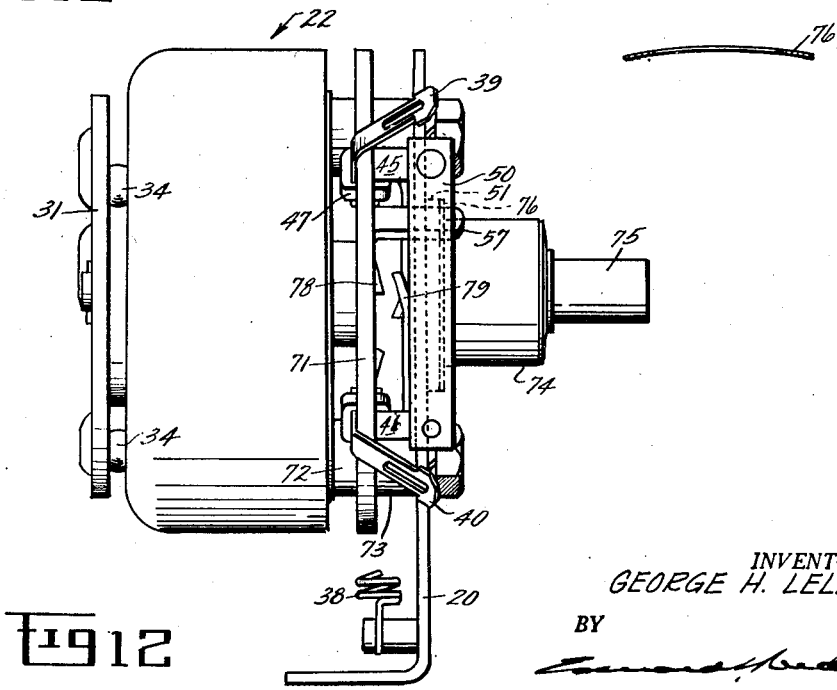
INVENTOR.
GEORGE H. LELAND
BY
ATTORNEY Patented Mar. 28, 1950

2,501,950

UNITED STATES PATENT OFFICE 2,501,950

COMMUTATING SWITCH MECHANISM

George H. Leland, Dayton, Ohio

Application July 10, 1947, Serial No. 760,029

15 Claims. (Cl. 172—126)

This invention relates to an electromagnetic device and more particularly to a commutating switch mechanism for such a device.

One object of the invention is to provide such a device having simple positively operated means for opening and closing the magnet circuit.

A further object of the invention is to provide such a device in which the circuit opening and closing means is operable at high speeds and in accurately timed relation to the movements of the magnet armature.

A further object of the invention is to provide such a device comprising a minimum number of moving parts, having low inertia, and which operates on low power.

A further object of the invention is to provide such a device in which the timing of the switching operation may be easily affected.

A further object of the invention is to provide such a device in which the movement of the switch controlling element is frictionally resisted.

A further object of the invention is to provide such a device including a rotary solenoid and in which the switch controlling element moves about the axis of the solenoid.

A further object of the invention is to provide such a device in which the circuit is opened and closed prior to the completion of the respective movements of the solenoid.

A further object of the invention is to provide such a device which is suitable for the operation of a commercial type of multiple switch circuit selector.

A further object of the invention is to provide such a device by which a rotary solenoid may be utilized to impart to a device to be operated a step by step forward movement or an oscillating movement.

Other objects of the invention may appear as the device is described in detail.

In the accompanying drawings Fig. 1 is a side elevation of a device embodying the invention; Fig. 2 is a longitudinal section taken through the device of Fig. 1; Fig. 3 is a sectional detail of a portion of the rotary solenoid; Fig. 4 is a section taken on the line 4—4 looking in the direction of the arrows 4; Fig. 5 is a section taken on the same line looking in the direction of the arrows 5; Fig. 6 is a section taken on the line 6—6 of Fig. 2 looking in the direction of the arrows, and partly broken away; Fig. 7 is a section on the same line looking in the direction opposite the arrows and partly broken away; Fig. 8 is an elevation of the pressure spring for the switch controlling element; Fig. 9 is an edge view of the spring of Fig. 8; Fig. 10 is a front elevation of a slightly modified form of the invention; Fig. 11 is a section taken on the line 11—11 of Fig. 10; Fig. 12 is a side elevation of the device of Fig. 10; Fig. 13 is a detail view of the pressure spring of Fig. 11; Fig 14 is a front elevation of another modified form of the device; and Fig. 15 is a section taken on the line 15—15 of Fig. 14.

In these drawings I have illustrated certain embodiments of my invention, in each of which an electromagnet is a rotary solenoid of the type shown and described in my applications for patent Serial Number 542,188, filed June 26, 1944, now Patent No. 2,496,880, granted February 7, 1950, and Serial Number 632,530, filed December 3, 1945, now Patent No. 2,473,598, granted June 21, 1949. It is to be understood, however, that the device as a whole as well as the several parts thereof, may take various forms and that the electromagnet may be of any suitable type, without departing from the spirit of the invention.

In the several embodiments here illustrated the device comprises a supporting structure 20 having means, such as a foot piece 21, whereby it may be mounted on a suitable support. Mounted on this structure is a rotary solenoid 22 the construction and operation of which are fully described in the above mentioned patents. The rotary solenoid comprises a circular housing 23 in which is mounted an annular magnetizing coil 24. Rigid with the back wall 25 of the housing is a core 26. The front wall 27 of the housing is provided with an opening in which is mounted an armature 28. Rigidly connected with the armature is a shaft 29 which is mounted in a bushing 30, in the core 26 and back wall 25, and which has rotary movement and axial movement. Rigidly secured to the shaft 29 and the armature 28 is a plate 31 which overlaps the front wall 27 of the housing. The front wall and the plate are provided with a plurality of pairs of opposed arcuate grooves 32 and 33 and in each pair of grooves there is mounted a ball 34, the bottom or base walls of the grooves of each pair being inclined as shown in Fig. 3. The energization of the magnet imparts axial movement to the armature and shaft and thereby presses the plate 31 against the balls in the respective pairs of inclined grooves and causes the plate to move on the balls from the position shown in full lines in Fig. 3 to the position shown in dotted lines in that figure, the balls moving from the shallow portions of the grooves to the deeper portions thereof. Thus each energization of the magnet imparts both axial movement and rotary movement to the armature and shaft. The solenoid may be mounted on the structure 20 in any suitable manner and in the present instance it is supported by two threaded studs 35 rigidly mounted in the back wall of the solenoid, extending through the structure 20 and secured thereto by nuts 36, spacing sleeves 37 being interposed between the solenoid and the supporting structure. Means are provided for retracting the armature after each movement thereof by the magnet of the solenoid. This means is here shown as a spring 38 connected with the armature and with the supporting structure.

A suitable switch is connected in circuit with the magnet and means are provided for opening and closing that circuit in timed relation to the movements of the armature. This means preferably comprises a controlling element which when moved in one direction will open the circuit as the armature approaches the end of its movement by the magnet and when moved in the other direction will close the circuit as the armature approaches the end of its retracting movement. These movements are imparted to the controlling element by an element connected with the armature for movement thereby.

In the particular embodiment shown in Figs. 1 to 9 two terminals 39 and 40 are connected with a direct current power line 41, which includes a master switch 43 by which the operation of the device may be initiated and terminated. In this particular arrangement the terminals 39 and 40 are mounted on a member 44 supported by and insulated from the supporting structure. Preferably the member 44 is formed of insulating material, such as fiber, or a plastic material, and it is here shown as circular in form. Brackets 45 and 46 are rigidly secured to the insulating member 44 and are electrically connected with the respective terminals 39 and 40, as by conducting attaching devices 47.

The automatically controlled switch is preferably of the self closing type and as here shown comprises a fixed contact member 48 mounted on the bracket 45, and a movable contact member 49. The movable contact member 49 is secured to one end of an arm 50, of conducting material, the other end of which is mounted on and electrically connected with the bracket 46. The arm 50 is biased toward the fixed contact 48 and is preferably of resilient material, such as copper, so shaped and mounted as to bias the movable contact member toward the fixed member and retain the same in engagement therewith when the movement of the arm 50 is unrestrained. The switch controlling device may take various forms and is here shown as an element 51 mounted for pivotal movement about a fixed axis, and formed of insulating material. When, as in the present instance, the supporting structure is provided with a bearing 52 the controlling element is preferably mounted on that bearing on the outer side of the supporting structure. In the arrangement here illustrated the controlling element comprises two arms 53 and 54 which are substantially parallel and are spaced substantial distances one from the other circumferentially of the pivotal axis of the element. The arm 53 has a cam shaped end portion 55 arranged to engage the resilient arm 50 and actuate the same to move the movable contact 49 out of engagement with the fixed contact 48, the arm 50 being preferably provided with a projection, or offset portion, 56 with which the cam arm 53 may contact. An actuating element, or arm, 57 is connected with the armature for movement therewith and extends forwardly between the arms 53 and 54 of the controlling element. When the armature is in its retracted position the actuating member 57 is in contact with the cam arm 53 and retains the same in an inoperative position, with the switch closed. When the master switch is open the self closing switch remains closed. When the master switch is closed to energize the magnet the actuating arm 57 is moved out of engagement with the cam arm 53 into engagement with the arm 54 of the controlling element and moves the cam arm into engagement with the resilient arm 50, thereby opening the switch. The actuating arm is of a width much less than the distance between the arms 53 and 54 and does not engage the arm 54 until the armature approaches the end of its movement by the magnet, thus the switch is opened just before the armature reaches the end of that movement and the momentum of the armature and the residual energy in the magnet complete the movement of the armature after the controlling switch has been opened. Upon the completion of the movement of the armature by the magnet the armature is immediately and quickly retracted by the spring 38 and the actuating arm engages the cam arm 53 and moves the same out of engagement with the resilient arm as the armature approaches the end of its retracting movement, thus releasing the movable member of the switch for movement to switch closing position. The switch is thus closed before the armature completes its retracting movement but that retracting movement is very rapid and is completed before the magnet is fully energized.

The opening and closing of the switch may be timed by varying the distance between the arms 53 and 54 or by varying the width of the actuating arm 57 with relation to that distance. Means are provided for yieldably retaining the controlling element in the position to which it has been moved and thus preventing the movement of the cam arm into engagement with the resilient arm after the actuating arm has been moved out of engagement therewith and before the actuating arm has engaged the arm 54 of the controlling element. The simplest form of such a retaining means is a frictional means and as here shown a resilient element is provided for pressing the controlling element into frictional contact with the supporting structure 20. The controlling element is preferably formed of fiber or other material having a relatively high frictional coefficient. The spring acting on the controlling element may take various forms. As shown more particularly in Figs. 2, 6, and 9 it comprises an elongate resilient member 58 curved about a transverse axis as shown in Fig. 9 and having a central opening 59 of a diameter at least as large as the diameter of the bearing 50. The spring is provided adjacent its ends with openings 60 by which it is mounted about and supported on studs or rods connected with the supporting structure. The spring is mounted with its central portion in contact with the controlling element and the end portions thereof are then moved into substantial alinement with the central portion to place the spring under tension and thus cause it to exert pressure on the controlling element.

Means are provided for connecting a part to be operated with the armature for movement thereby. As shown in Figs. 1 to 7 the part to be operated is a shaft 61 rotatably mounted in the bearing 52 of the supporting structure and the connecting means are of such a character as to impart step by step rotary movement to the shaft in one direction only. For this purpose the adjacent ends of the armature shaft 29 and the shaft 61 are provided with ratchet devices by which the shaft 61 will be rotated a predetermined distance upon each movement of the armature by the magnet and will remain in the position to which it has been advanced during the retracting movement of the armature. These connecting members may be of any suitable character and as shown in Figs. 4 and 5 a disk 62 rigidly secured to the shaft 61 is provided with a plurality of teeth 63, in the present instance four, which are deflected slightly from the plane of the disk, and a second disk 64 is secured to the armature shaft 29 and is also provided with a plurality of teeth 65, in the present instance three, the points of which are deflected toward the teeth of the disk 62. When the magnet is energized the axial movement of the armature shaft moves one of the teeth 65 into the plane of one of the teeth 63 and the rotary movement of the armature shaft moves that tooth 65 into engagement with the tooth 63 and thus transmits rotary movement to the shaft 61. The teeth of the two disks are so arranged that upon each operation of the armature shaft a single tooth 65 will engage one of the teeth 63 and advance the disk 62 and the shaft 61 a predetermined distance. Preferably the actuating element 57 is formed integral with the edge portion of the disk 64.

In the construction here shown the supporting structure 20 also forms the end member of a frame on which may be supported devices to be actuated by the shaft 61, such as a commercial type of multiple circuit switch selector. This frame comprises two rods 66 which are threaded in or otherwise connected with the supporting structure 20 and are supported at their outer ends by a second supporting member, not here shown, but which also provides support for the outer end of the shaft 61. These rods are, in the present instance, screwed into a connecting member 68 which is mounted in the supporting structure 20. Spacing sleeves 67 on the rods engage the insulating member 44 so that the tightening of the threaded rods in the member 68 clamps the insulating member on the rods. The end portions of the spring 58 are mounted on the connecting members 68 and are held against outward movement by an enlarged portion 68a on the member 68, thus retaining the spring in tension.

In Figs. 10 to 13 I have illustrated a slightly modified form of the device which operates in the same manner as the device above described and differs therefrom principally in the location of the several parts. The solenoid is the same as heretofore described and the supporting structure is also the same and therefore these parts have been given the same reference numerals. The solenoid is connected with the supporting structure by bolts 69 which extend through the supporting structure 20 and are retained therein by nuts 70. However, in this instance the insulating element 71, which carries the terminals 39 and 40, is arranged between the solenoid and the supporting structure and is approximately semi-circular in shape rather than annular, the end portions of the member 71 having openings to receive the bolts 69 on which it is mounted. The member 71 is spaced from the armature by spacing collars 72 and from the supporting structure by spacing collars 73. The bearing 74 which is carried by the supporting structure is in axial alinement with the armature shaft 29 and is of a length somewhat greater than the length of the bearing 52, as shown in Fig. 2, and is thus adapted to form the sole support for a shaft 75. The switch controlling element 51 is mounted on the hub 74 and operates in the same manner as above described but in this instance the spring 76 which exerts pressure on the controlling element is a circular disk curved about an axis in the plane thereof and provided with a central opening to receive the bearing, as shown in Fig. 13, and is placed under tension by confining the same between the controlling element and a shoulder 77 on the bearing. The connections between the shaft 75 and the armature shaft 29 may be ratchet elements 78 and 79, as shown in Figs. 4 and 5, which serve to transmit rotary movement from the armature to the shaft 75, in a step by step manner.

The modification shown in Figs. 14 and 15 differs but little from the form shown in Figs. 10 to 13 but in this instance the part to be operated is a shaft 80 journaled in a bearing 81 on the supporting structure 20 and is rigidly connected with the armature shaft 29 for movement therewith, and may if desired be formed integral with the armature shaft. Thus the rotary solenoid functions as an oscillatory motor and imparts oscillatory movement to the shaft 80. A member 82 is secured to the shaft 80 for oscillatory movement therewith and the actuating element for the switch controlling element 51 is a pin 83 secured to the member 82 and extending between the arms of the controlling element. A spring 38a connected with a stud 84 on the member 82 and with the supporting structure retracts the actuating element and the armature after each energization of the latter. The member 82 may constitute a device to be operated or may be provided with means for actuating such a device, such as a wrist pin 85 or gear teeth or a cam surface.

From the foregoing description it will be apparent that when the master switch has been closed to initiate the energization of the magnet the commutating switch will be actuated at high speed to open and close the magnet circuit and thus cause the armature and its shaft to oscillate at a high speed. It will also be apparent that the commutating switch and the mechanism as a whole are very simple in construction and may be accurately timed. The device can be utilized to actuate parts of devices of various kinds and is easily adaptable to the various uses to which it may be put. It may, when desirable, be provided with a holding circuit to maintain a slight energization of the magnet when the commutating switch is open. As shown in Fig. 1 this holding circuit is provided by connecting a resistor 84' across the terminals 39 and 40.

While I have shown and described one embodiment of my invention and certain modifications thereof, I wish it to be understood that I do not desire to be limited to the details thereof, as various other modifications may occur to a person skilled in the art.

Having now fully described my invention what I claim as new and desire to secure by Letters Patent is:

1. In a device of the character described an electromagnet, a single armature supported for both axial movement and rotary movement by said magnet, means for retracting said armature after each movement thereof by said magnet, a switch in circuit with said magnet and including a movable contact member, a resilient arm supporting said contact member and biased to switch closing position, a cam element supported independently of said armature for moving said arm to switch opening position, and an actuating element connected with said armature for movement thereby and arranged to move said cam element in switch opening direction as said armature approaches the end of its movement by said magnet and in a direction to release said resilient arm as said armature approaches the end of its retracting movement.

2. In a device of the character described an electromagnet, an armature supported for both axial movement and rotary movement by said magnet, means for retracting said armature after each movement thereof by said magnet, a switch in circuit with said magnet and including a movable contact member, a resilient arm supporting said contact member and biased to switch closing position, a cam element movable with relation to said arm to move the latter to switch opening position, an actuating element connected with said armature for movement therewith and arranged to move said cam element in switch closing direction as said armature approaches the end of its movement by said magnet and in a direction to release said resilient arm as said armature approaches the end of its retracting movement, and friction means for preventing the movement of said cam element during the initial portion of said retracting movement.

3. In a device of the character described an electromagnet, an armature supported for both axial movement and rotary movement by said magnet, means for retracting said armature after each movement thereof by said magnet, a switch in circuit with said magnet and including a movable contact member, means for actuating said contact member including a controlling element mounted for movement with relation to said contact member, an actuating element connected with said armature for movement thereby, one of said elements having two parts spaced one from the other and the other of said elements having a part extending between said parts of the first mentioned element and of a width materially less than the distance between said parts, the arrangement of said parts being such that said actuating element will move said controlling element in switch opening direction as said armature approaches the end of its movement by said magnet and will move said controlling element in switch closing direction as said armature approaches the end of its retracting movement.

4. In a device of the character described an electromagnet, an armature supported for both axial movement and rotary movement by said magnet, means for retracting said armature after each movement thereof by said magnet, a switch in circuit with said magnet and including a movable contact member, means for actuating said contact member including a controlling element mounted for movement with relation to said contact member, an actuating element connected with said armature for movement thereby, one of said elements having two parts spaced one from the other and the other of said elements having a part extending between said parts of the first mentioned element and of a width materially less than the distance between said parts, the arrangement of said parts being such that said actuating element will move said controlling element in switch opening direction as said armature approaches the end of its movement by said magnet and will move said controlling element in switch closing direction as said armature approaches the end of its retracting movement, and means for yieldably resisting the movement of said controlling element during the interval between the aforesaid movements.

5. In a device of the character described an electromagnet, a movable armature for said magnet, means for retracting said armature after each movement thereof by said magnet, a switch in circuit with said magnet and including a movable contact member, a supporting member for said movable contact member biased to switch closing position and having a projection, a controlling element moving about a fixed axis and including an arm having a cam shaped portion and a second arm spaced from and substantially parallel with said cam arm, an actuating arm connected with said armature for movement thereby and extending between the arms of said controlling element, said actuating arm being so positioned with relation to said armature that it will retain said cam arm out of engagement with said supporting member when said armature is in its retracted position, will engage said second arm as said armature approaches the end of its movement by said magnet and cause said cam arm to engage said supporting member and move said supporting member to and retain the same in switch opening position, and will again engage said cam arm and move the same out of engagement with said supporting member as said armature approaches the end of its retracting movement.

6. In a device of the character described a supporting structure, an electromagnet supported by said structure, a movable armature for said magnet, means for retracting said armature after each energization of said magnet, two terminals supported by and insulated from said structure, spaced one from the other and adapted to be connected with the respective sides of the magnet circuit, a switch including a stationary member connected with one of said terminals and a movable member, an elongate conducting member supported at one end by said structure and connected with the other of said terminals, the other end of said conducting member being biased toward said stationary switch member and having supporting and conducting connection with said movable switch member, and means actuated by said armature for moving said movable switch member to switch opening position as said armature approaches the end of its movement by said magnet and for releasing said movable switch member for movement to switch closing position as said armature approaches the end of its retracting movement.

7. In a device of the character described an electromagnet, an armature rotatable by said magnet, means for retracting said armature after each movement thereof by said magnet, a self closing switch in circuit with said magnet, a switch controlling element movable about the axis of said armature, and an actuating element connected with said armature for movement therewith, spaced from the axis thereof and arranged to engage said controlling element to move the latter in switch opening direction as said armature approaches the end of its movement by said magnet and then in switch closing direction as said armature approaches the end of its retracting movement.

8. In a device of the character described a supporting structure, an electromagnet supported by said structure, an armature rotatable by said magnet, means for retracting said armature after each movement thereof by said magnet, a self closing switch in circuit with said magnet, a switch controlling element mounted adjacent said structure and movable about the axis of said armature, an actuating element connected with said armature for movement therewith, spaced from the axis thereof and arranged to move said controlling element in switch opening direction as said armature approaches the end of its movement by said magnet and to then move said controlling element in switch closing direction as said armature approaches the end of its retracting movement, and a spring pressing said controlling element against said supporting structure to prevent the movement thereof when said actuating element is out of engagement with said controlling element.

9. In a device of the character described a supporting structure, an electromagnet, an armature rotatable by said magnet, means for retracting said armature after each movement thereof by said magnet, said structure having a bearing in line with the axis of said armature, a self closing switch in circuit with said magnet, a movable switch controlling element supported on said bearing for movement about said axis and having spaced parts, an actuating element connected with said armature for movement therewith, spaced from the axis thereof and extending between said spaced parts of said controlling element, said actuating element being of a width materially less than the distance between said spaced parts and being so arranged with relation to said armature that it will engage one of said parts and move said controlling element in switch opening direction as said armature approaches the end of its movement by said magnet and will engage the other of said parts to move said controlling element in switch closing direction as said armature approaches the end of its retracting movement, an elongate spring curved about a transverse axis and supported about the axis of said armature with its central portion in contact with said controlling element, and means carried by said supporting structure and engaging the respective ends of said spring to decrease the curvature of the latter and cause the spring to maintain said controlling element in frictional contact with said supporting structure and thereby prevent the movement of said controlling element when said actuating element is not in contact with either part thereof.

10. In a device of the character described a supporting structure, an electromagnet supported by said structure, an armature rotatable by said magnet, means for retracting said armature after each movement thereof by said magnet, a member rotatably supported by said structure substantially in axial alinement with said armature, and connected with said armature for movement therewith in both directions of movement of said armature, a self closing switch in circuit with said magnet and supported independently of said armature, and means actuated by said armature for opening said switch as said armature approaches the end of its movement by said magnet and for releasing said switch for closing movement as said armature approaches the end of its retracting movement, whereby oscillatory movement is imparted to said member.

11. In a device of the character described a supporting structure, an electromagnet supported by said structure, an armature rotatable by said magnet, means for retracting said armature after each movement thereof by said magnet, a member rotatably supported by said structure substantially in axial alinement with said armature, means for connecting said member with said armature for movement thereby, a switch in circuit with said magnet, means controlled by said armature for opening said switch as said armature approaches the end of its movement by said magnet and for closing said switch as said armature approaches the end of its retracting movement, and a holding circuit connected across said magnet circuit to maintain a slight energization of said magnet when said switch is open.

12. In a device of the character described a supporting structure, an electromagnet supported by said structure, an axially movable armature for said magnet, means controlled by the axial movement of said armature for imparting rotary movement thereto, means for retracting said armature after each movement thereof by said magnet, a member to be operated rotatably supported by said structure substantially in axial alinement with said armature, means controlled by the axial and rotary movements of said armature for connecting said member with said armature and imparting rotary movement thereto, a switch in circuit with said magnet, means controlled by said armature for opening said switch as said armature approaches the end of its movement by said magnet and for closing said switch as said armature approches the end of its movement by said magnet and for closing said switch as said armature approaches the end of its retracting movement.

13. In a device of the character described a supporting structure, an electromagnet supported by said structure, an axially movable armature for said magnet, means controlled by the axial movement of said armature for imparting rotary movement thereto, means for retracting said armature after each movement thereof by said magnet, a member to be operated rotatably supported by said structure substantially in axial alinement with said armature, means controlled by the axial and rotary movements of said armature for connecting said member with said armature and imparting rotary movement thereto in one direction only, a self closing switch in circuit with said magnet, and means actuated by said armature for opening said switch as said armature approaches the end of its movement by said magnet and for releasing said switch for closing movement as said armature approaches the end of its retracting movement and thereby imparting to said member successive rotary movements in the same direction.

14. In a device of the character described, an electromagnet, a movable armature for said magnet, means for retracting said armature after each movement thereof by said magnet, a switch in circuit with said magnet and including a movable contact member, spring means for moving said contact member in one direction, a switch controlling element movable with relation to said armature and said contact member and having an arm to move said contact member against the action of said spring means, and also having a second arm spaced from and operatively connected with the first mentioned arm, and an actuating arm connected with said armature for movement thereby, extending between said switch controlling arms and of a width materially less than the distance between the latter, the arrangement of said arms with relation one to the other being such that during the latter portion of the movement of said armature in one direction said actuating arm will engage said second switch controlling arm and move said movable contact member against the action of said spring means and prevent the return movement of the same prior to the completion of said movement of said armature, and the latter portion of the movement of said armature in the other direction which will cause said actuating arm to engage the first mentioned switch controlling arm and move the latter to a position to release said switch controlling arm for movement by said spring means.

15. In a device of the character described, an electromagnet, a rotatable armature for said magnet, means for retracting said armature after each movement thereof by said magnet, a switch in circuit with said magnet and including a movable contact member, a resilient member to support said movable contact member and retain the same in a predetermined position, a pivoted switch controlling element movable with relation to said resilient member and comprising two rigidly connected arms spaced one from the other in the direction of their movement, one of said arms being adapted to actuate said contact member, and an actuating arm connected with said armature for movement therewith about the axis thereof, extending between said switch controlling arms and of a width materially less than the distance between the latter, said actuating member being arranged to engage the other of said switch controlling arms when said armature moves in one direction and move the first mentioned switch controlling arm in a direction to move said contact member against the action of said resilient member, and to engage said first mentioned switch controlling arm and move the latter in a direction to release said switch member for movement by said resilient member during the latter part of the movement of said armature in the other direction.

GEORGE H. LELAND.

REFERENCES CITED

The following references are of record in the file of this patent:

UNITED STATES PATENTS

| Number | Name | Date |
|---|---|---|
| 395,575 | Marvin | Jan. 1, 1889 |
| 1,027,166 | Andrews | May 21, 1912 |
| 1,469,654 | Kotzebue | Oct. 2, 1923 |
| 1,567,053 | Hibbard | Dec. 29, 1925 |
| 1,692,409 | Hobbs | Nov. 20, 1928 |
| 1,728,338 | Jeanneret | Sept. 17, 1929 |
| 1,737,387 | Redmond | Nov. 26, 1929 |
| 2,344,523 | Stern | Mar. 21, 1944 |

FOREIGN PATENTS

| Number | Country | Date |
|---|---|---|
| 452,334 | Great Britain | Aug. 20, 1936 |
| 251,802 | Italy | Feb. 3, 1927 |